June 9, 1942.  G. A. KNEEDLER  2,285,725
AIR CONDITIONER
Filed May 6, 1940  3 Sheets-Sheet 1

Inventor
George A. Kneedler,
By Stanley Burch
Attorney

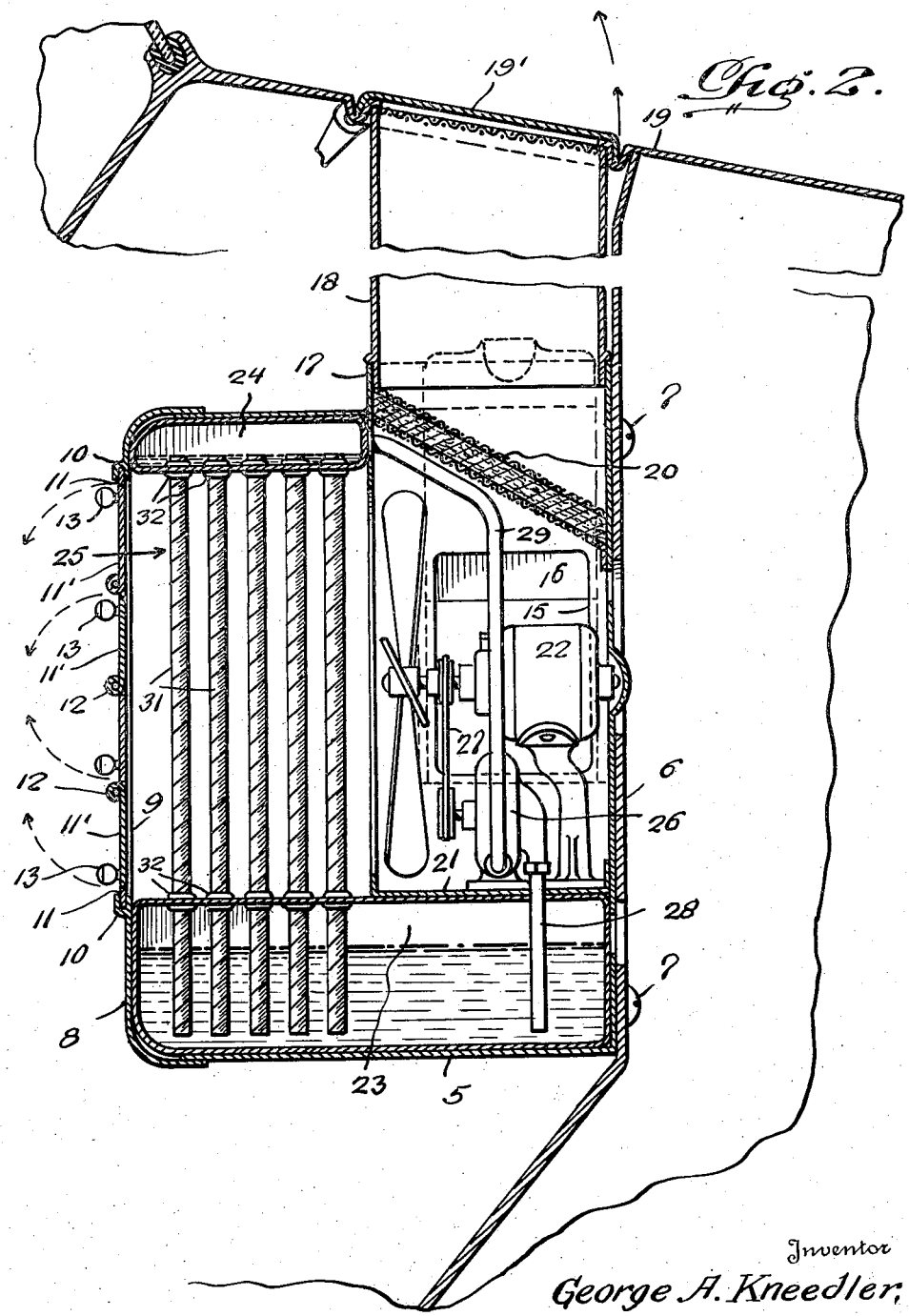

June 9, 1942.  G. A. KNEEDLER  2,285,725
AIR CONDITIONER
Filed May 6, 1940  3 Sheets-Sheet 3
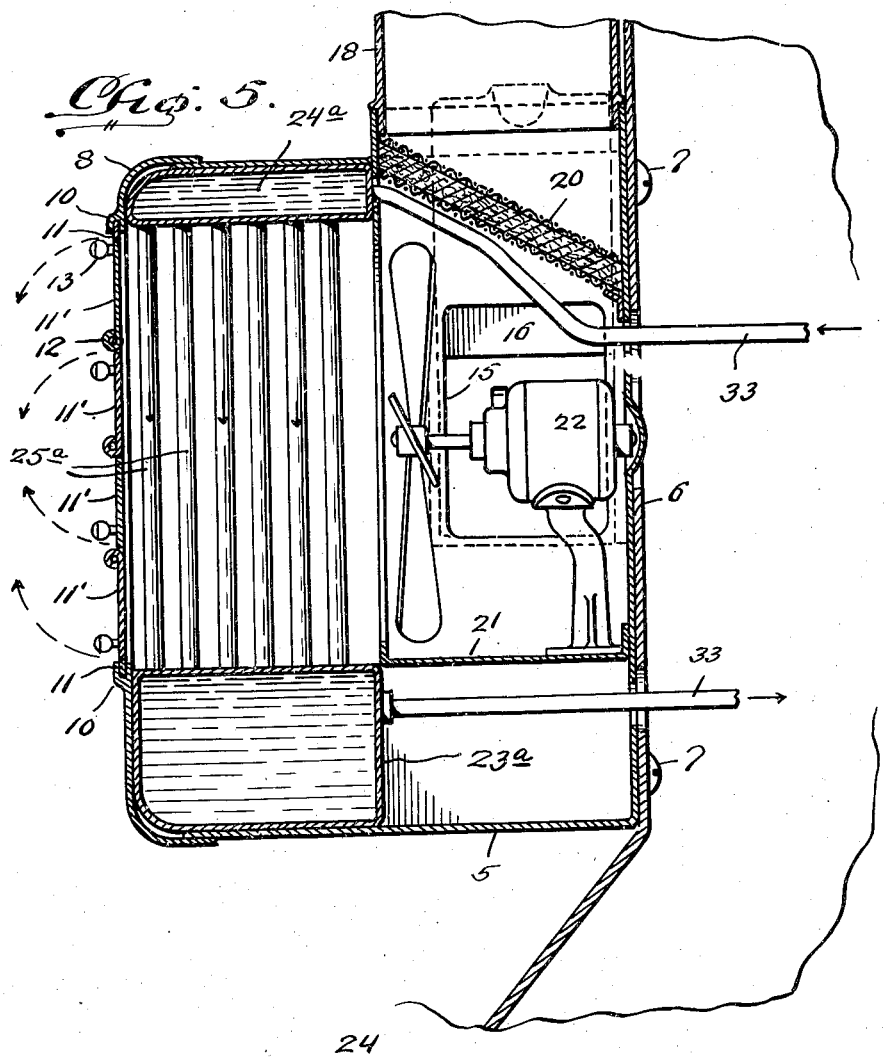
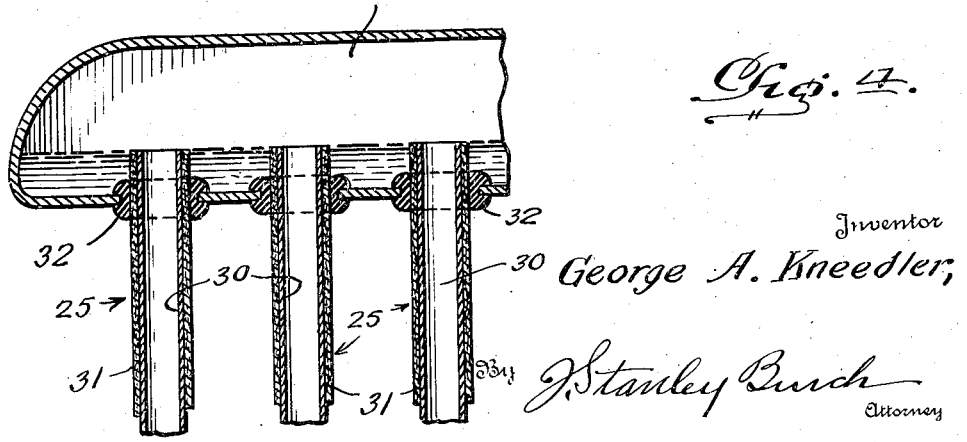
Inventor
George A. Kneedler
By J. Stanley Burch
Attorney Patented June 9, 1942

2,285,725

UNITED STATES PATENT OFFICE 2,285,725

AIR CONDITIONER

George A. Kneedler, Vernon, Tex.

Application May 6, 1940, Serial No. 333,645

4 Claims. (Cl. 261—30)

This invention relates to an improved air conditioner for automobiles of the closed body type, and has more particular reference to an apparatus of this kind adapted to supply moist and cool air to the interior of the automobile body in warm weather, to circulate and moisten and cool the air in the automobile body in warm weather, or to circulate and heat the air in the automobile body in cold weather.

The primary object of the present invention is to provide an apparatus of the above kind which is comparatively simple and durable in construction, which is highly efficient in use, and easy to install, and which may be quickly and easily converted for the desired use.

Generally described, the present invention contemplates the provision of an open-rear casing secured to the dash board of the automobile at the rear of said dash board so as to be within the automobile body, said casing having side and top air inlet openings respectively provided with a closure and adapted for connection with the cowl ventilator of the automobile. An air circulating fan is suitably mounted within the front upper portion of the casing, and an air conditioning unit is removably fitted in the rear portion of the casing, being retained in place by means of a cover removably applied to the rear of the casing and having a large air outlet opening equipped with suitable shutters for controlling the escape of air after being conditioned. For summer use, the air conditioning unit is adapted to cool and moisten the air supplied to the interior of the automobile body or circulated therein, this unit consisting of upper and lower water tanks connected by vertical wick elements and means for circulating water from the lower tank to the upper tank so as to maintain the absorbent members of the wick elements in a saturated condition. With this arrangement, fresh air may be admitted by opening the cowl ventilator and closing the side air inlet of the casing, such fresh air being cooled and moistened before being discharged into the interior of the automobile body. On the other hand, the cowl ventilator may be closed and the side air inlet of the casing may be opened so as to circulate, cool and moisten the air already in the automobile body. For winter use, the air conditioning unit consists in an ordinary hot water radiator unit fitted in the rear of the casing upon removal of the air cooling and moistening unit, such hot water radiator being adapted for connection with the water cooling system of the automobile engine in a generally well known and conventional manner. Desirably, this hot water radiator preferably consists in top and bottom headers or tanks connected by vertical water tubes between which the air may be forced by the air circulating fan for heating such air immediately prior to its discharge into the automobile body. When this heating unit is used, the cowl ventilator will ordinarily be closed and the side inlet opening of the casing will be opened so as to cause circulation and heating of the air already in the automobile body.

Other objects and features of the present invention will become apparent from the following description when considered in connection with the accompanying drawings, and the invention consists in the novel form, combination and arrangement of parts hereinafter more fully described, shown in said drawings and claimed.

In the drawings:

Figure 2 is a central vertical sectional view of the device as shown in Figure 1.

Figure 1:
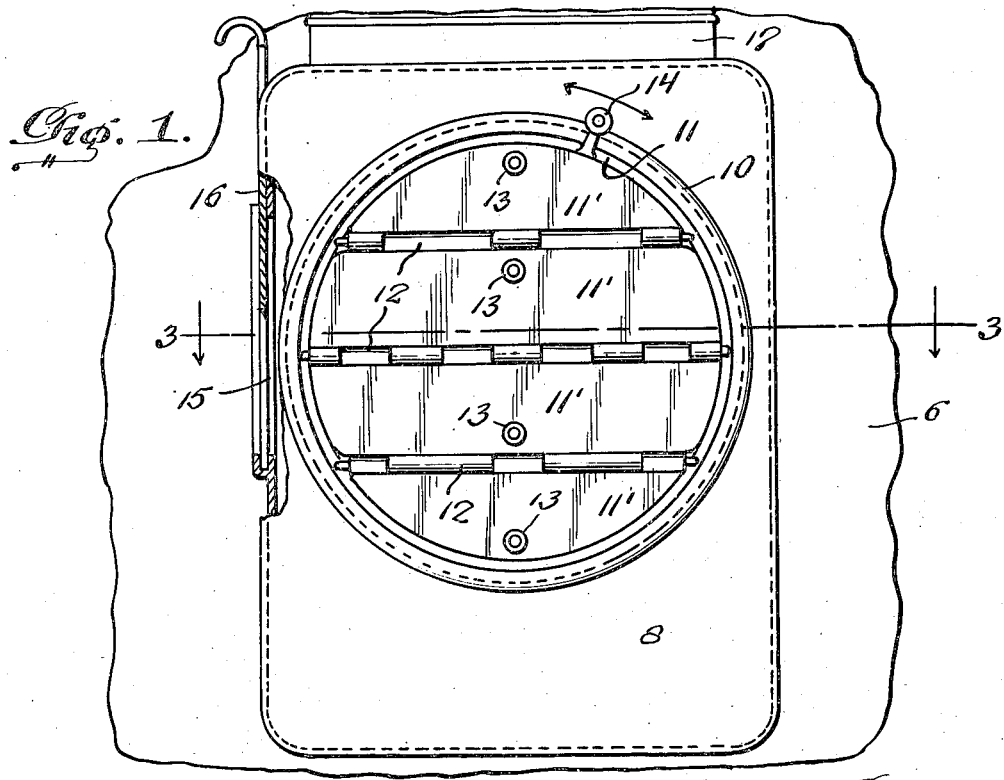
Figure 1 is a fragmentary rear elevational view of an air conditioner constructed in accordance with the present invention and installed for use in an automobile with the air conditioning unit in the form of an air cooling and moistening device, parts being broken away and in section.

Figure 4 is an enlarged fragmentary vertical section through the upper portion of the air conditioning unit shown in Figure 2, so as to more clearly show the construction of the wick elements and the manner in which they are associated with the water tanks; and Figure 5 is a view similar to Figure 2 with the air cooling and moistening unit removed and a hot water radiator fitted in the casing in lieu thereof.

Referring in detail to the drawings, 5 indicates a substantially rectangular casing which is rigidly secured to the dash board 6 of the automobile at the rear of said dash board and by suitable means such as bolts 7 or the like. This casing is open at the rear and has a cover 8 removably fitted on the rear thereof, which cover has a relatively large air discharge opening 9. About this opening 9, the cover 8 is formed with a grooved portion 10 in which is rotatably fitted a ring 11 carrying a plurality of vertically swinging shutters 11' which may be manually opened the desired degree to control the flow or discharge of air from the casing. These shutters will remain in any position to which they are adjusted by reason of friction hinges 12 provided for the same, and suitable knobs 13 are provided on the shutters for manually manipulating the same. By rotating the ring 11, the shutters may be rotarily adjusted to control the direction in which the air is deflected as it is discharged with the shutters partially open. The ring 11 has a suitable handle 14 so that the same may be manually turned.

Casing 5 is also provided in one side and near the front with an air inlet opening 15 with which is associated a suitable slide or other manually operable closure 16. By the use of this slide, the desired amount of air may be admitted to the casing 5, or the air may be entirely excluded from entrance into the casing through this side opening 15. At the front upper portion of the casing 5, the latter is provided with a top air inlet 17 adapted to be connected by means of a suitable conduit 18 with the cowl 19 of the automobile and in registry with the cowl ventilating opening thereof. This cowl ventilating opening is provided with the usual or any preferred form of closure 19' which may be controlled from the driver's seat in a generally well known manner so as to admit any desired amount of air into the interior of the automobile body. By use of the conduit 18, such fresh air admitted by opening the cowl ventilating closure 19' is caused to pass into the casing 5. Thus, it will be seen that the air to be conditioned may either be admitted from the exterior of the automobile body through the usual cowl ventilator, or such air may be admitted through the side opening 15 so that the air already within the automobile body may be circulated through the air conditioner. Located in the top of the casing 5 at the top air inlet 17 is a suitable air filter 20 by means of which dust and other foreign matter may be removed from the air before it is conditioned or treated and discharged into the automobile body. Provided in the front portion of the casing 5 is an elevated partition or platform 21 upon which is mounted a suitable motor-operated air circulating fan 22. This fan is arranged to draw the air into the casing through either the side inlet 15 or top inlet 17 and discharge the same through the rear of the casing when the shutters 11' are opened.

Figure 3:
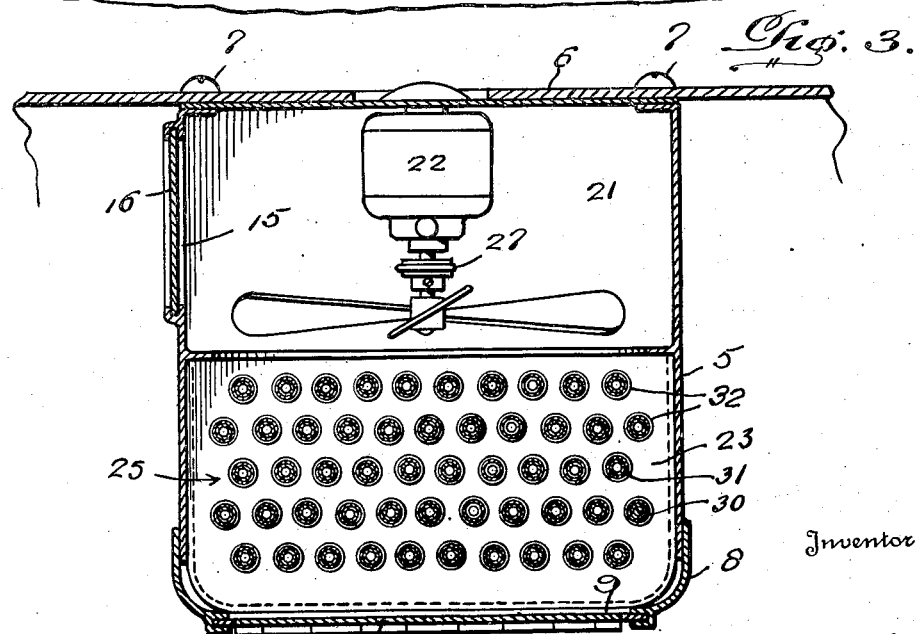
Figure 3 is a horizontal section on line 3—3 of Figure 1.

When the device is used in warm weather, an air conditioning unit is employed which is constructed as shown more clearly in Figures 2, 3 and 4. This unit is adapted to cool and moisten the air immediately prior to its discharge from the casing 5, and it includes a relatively large bottom tank 23, a smaller top tank 24, and wick elements 25 arranged vertically and connecting the tanks 23 and 24. This unit is removably fitted in the casing 5 by being slid forwardly into the same, and the wick elements 25 are disposed rearwardly of the fan 22 when the unit is positioned in place. A quantity of water is placed in the tank 23 through any suitable filler opening provided for the latter, and some of this water is elevated and discharged in the upper tank 24 by means of a pump 26 driven from the power shaft of fan 22 as at 27, the intake 28 of pump 26 extending into and adjacent the bottom of lower tank 23, and the discharge of pump 26 being connected by a pipe 29 with the upper tank 24 so as to discharge the water into the latter. Thus, the absorbent members of the wick elements 25 are maintained in a saturated condition not only by the capillary attraction of the water from lower tank 23, but also by saturation of the same by means of the water flowing thereto from the upper tank 24. As the absorbent members of these wick elements become saturated with water, the air forced rearwardly in contact with the same will be moistened and cooled before being discharged from the rear of the casing 5.

As shown more clearly in Figures 2 and 4, each wick element 25 consists of a rigid metallic tube 30 having its ends projecting into the tanks 23 and 24 and provided on the exterior thereof with tubular absorbent members 31 which may consist of spirally wound strips of fabric. The ends of the wick elements 25 extend through rubber bushings 32 fitted in openings of the bottom wall of tank 24 and the top wall of tank 23, so that the only water allowed to escape from the tanks to these wick elements will be that directly absorbed by the absorbent members or sheaths 31 thereof. Due to the snug fit of the wick elements in the bushings 23, the tanks are effectively connected and maintained in proper relation to each other.

With the device conditioned as described above and shown in Figures 1 to 4 inclusive, the motor-operated fan 22 may be placed in operation and air admitted to the casing 5 will be effectively moistened and cooled immediately prior to its discharge from the casing 5 into the automobile body. This air may be admitted from the automobile body through the side air inlet 15 by opening the closure 16, or it may be admitted from the outside by opening the closure 19' of the cowl ventilator. By rotating the shutter-carrying ring 11, the treated or conditioned air may be discharged in the desired direction to give best results.

For use in winter, the air conditioning unit of Figure 2 may be readily removed along with the pump 26 and its connections with the tanks 23 and 24, the openings in such tanks pierced by the pipes 28 and 29 being suitably plugged. A simple hot water radiator may then be employed as the air conditioning unit, being removably fitted in the rear portion of the casing 5 as shown in Figure 5. The cover 8 will then be applied again to the rear of the casing 5, the radiator being suitably connected in a generally well known manner with the water circulating or cooling system of the automobile engine. This hot water radiator preferably consists of a bottom tank or header 23a, a top tank or header 24a, and air heating water tubes 25a connecting the tanks 23a and 24a. The headers or tanks 23a and 24a are suitably connected as by means of pipes 33 with the engine cooling system, the front wall of casing 5 and dashboard 6 being provided with suitable openings through which these pipes may pass from the hot water radiator. As the air conditioning units are of the same general shape and size, they may be easily interchangeably employed in the casing 5, according to the season of the year and the desired type of air conditioner required for use. It is believed that the construction and operation, as well as the advantages of the present invention, will be readily understood and appreciated by those skilled in the art. The apparatus is very simple and is highly efficient for the intended purpose. Also, the device may be readily installed and conveniently converted for either of the intended uses. Minor changes in the details of construction illustrated and described may be made without departing from the spirit and scope of the invention as claimed.

What I claim as new is:

1. In combination with the dash board of a motor vehicle, a casing secured to the dash board at the rear of the latter and having an air inlet opening in the front portion of the same, said casing being open at the rear, an air circulating fan mounted in the front portion of the casing and adapted to draw air inwardly through said air inlet and to discharge the same rearwardly from the casing, an air conditioning unit separate from the fan and its mounting and removably fitted in the rear portion of the casing and having air treating elements disposed in the path of the air from said fan, said unit including upper and lower tanks connected by rigid air-treating elements, and a cover removably fitted on the rear of the casing and removably retaining said air conditioning unit in the casing.

2. In combination with the dash board of a motor vehicle, a casing secured to the dash board at the rear of the latter and having an air inlet opening in the front portion of the same, said casing being open at the rear, an air circulating fan mounted in the front portion of the casing and adapted to draw air inwardly through said air inlet and to discharge the same rearwardly from the casing, an air conditioning unit removably fitted in the rear portion of the casing and including upper and lower tanks connected by rigid air treating elements disposed in the path of the air from said fan, a cover removably fitted on the rear of the casing and retaining said air conditioning unit in the casing, said cover having a large air discharge opening, a ring rotarily mounted in said opening, and manually adjustable air-discharge controlling shutters pivoted upon parallel axes and carried by said ring.

3. In combination with the dash board of a motor vehicle, a casing secured to the dash board at the rear of the latter and having an air inlet opening in the front portion of the same, said casing being open at the rear, an air circulating fan mounted in the front portion of the casing and adapted to draw air inwardly through said air inlet and to discharge the same rearwardly from the casing, an air conditioning unit removably fitted in the rear portion of the casing and having air treating elements disposed in the path of the air from said fan, a cover removably fitted on the rear of the casing and retaining said air conditioning unit in the casing, said air inlet being in a side of the casing to receive air from within the vehicle body, a manually operable closure for said inlet, the casing further having a second top air inlet in the forward portion thereof, an air filter located in said top air inlet, and means to connect said top air inlet with the cowl ventilator opening of the automobile to receive air from outside the vehicle body.

4. In combination with the dash board of a motor vehicle, a casing secured to the dash board at the rear of the latter and having an air inlet opening in the front portion of the same, said casing being open at the rear, an air circulating fan mounted in the front portion of the casing and adapted to draw air inwardly through said air inlet and to discharge the same rearwardly from the casing, an air conditioning unit removably fitted in the rear portion of the casing and having air treating elements disposed in the path of the air from said fan, a cover removably fitted on the rear of the casing and retaining said air conditioning unit in the casing, said air conditioning unit including upper and lower water tanks connected by vertical air moistening wick elements, a power-operated pump located in the front of the casing for delivering water from the lower tank to the upper tank so that water is supplied to the wick elements at both the top and bottom end portions thereof, resilient bushings fitted in openings in the bottom wall of the top tank and in openings of the top wall of the bottom tank of the air conditioning unit, said wick elements comprising rigid metallic tubes having tubular sheaths of absorbent material thereon and disposed with the ends thereof snugly projecting through the bushings of said tanks.

GEORGE A. KNEEDLER.